(12) United States Patent
Hamberger et al.

(10) Patent No.: US 11,728,086 B2
(45) Date of Patent: Aug. 15, 2023

(54) RADIATOR FOR COOLING A TRANSFORMER OR A CHOKE, UNIT INCLUDING A TRANSFORMER OR A CHOKE AND METHOD FOR PRODUCING A RADIATOR

(71) Applicant: Siemens Energy Global GmbH & Co. KG, Munich (DE)

(72) Inventors: Peter Hamberger, Kirchschlag bei Linz (AT); Harald Mayer, Roethenbach an der Pegnitz (DE); Markus Stockner, Ybbsitz (AT); Anel Hrustic, Linz (AT)

(73) Assignee: Siemens Energy Global GmbH & Co. KG, Munich (DE)

( * ) Notice: Subject to any disclaimer, the term of this patent is extended or adjusted under 35 U.S.C. 154(b) by 334 days.

(21) Appl. No.: 17/098,601

(22) Filed: Nov. 16, 2020

(65) Prior Publication Data

US 2021/0151239 A1 May 20, 2021

(30) Foreign Application Priority Data

Nov. 14, 2019 (EP) ..................... 19209070

(51) Int. Cl.
*H01F 27/10* (2006.01)
*B23P 15/26* (2006.01)
*F28D 1/02* (2006.01)
*H01F 27/22* (2006.01)

(52) U.S. Cl.
CPC .............. *H01F 27/22* (2013.01); *B23P 15/26* (2013.01); *F28D 1/0233* (2013.01); *H01F 27/10* (2013.01)

(58) Field of Classification Search
CPC .......... H01F 27/22; H01F 27/08; H01F 27/10; H01F 27/105; H01F 27/12; H01F 27/125; B23P 15/26; F28D 1/0233
See application file for complete search history.

(56) References Cited

U.S. PATENT DOCUMENTS

| | | | |
|---|---|---|---|
| 3,489,209 A | 1/1970 | Johnson | |
| 2012/0199328 A1* | 8/2012 | Gong | F28F 1/128 29/890.03 |

FOREIGN PATENT DOCUMENTS

| | | |
|---|---|---|
| DE | 1971624 U | 11/1967 |
| DE | 2114340 A1 | 10/1972 |
| DE | 10010737 A1 | 9/2001 |
| DE | 20118511 U1 | 2/2002 |
| EP | 0479012 A1 | 4/1992 |
| EP | 3001434 A1 | 3/2016 |

* cited by examiner

*Primary Examiner* — Jacob M Amick
(74) *Attorney, Agent, or Firm* — Laurence A. Greenberg; Werner H. Stemer; Ralph E. Locher

(57) ABSTRACT

A radiator for cooling a transformer, preferably a power transformer, or a choke, includes a plurality of plate-shaped radiator elements which are disposed parallel to one another and through which a coolant can flow in parallel. At least one elastically deformable element is provided at least between two adjacent radiator elements and is constructed in such a way that it counteracts an expansion of the radiator elements perpendicular to the surface of the radiator elements. Plastic deformation of the walls of the radiator elements can be prevented by the elastically deformable elements. A unit including a transformer or a choke and a method for producing a radiator are also provided.

13 Claims, 2 Drawing Sheets

RADIATOR FOR COOLING A TRANSFORMER OR A CHOKE, UNIT INCLUDING A TRANSFORMER OR A CHOKE AND METHOD FOR PRODUCING A RADIATOR

CROSS-REFERENCE TO RELATED APPLICATION

This application claims the priority, under 35 U.S.C. § 119, of European Patent Application EP 19 209 070, filed Nov. 14, 2019; the prior application is herewith incorporated by reference in its entirety.

BACKGROUND OF THE INVENTION

Field of the Invention

The invention relates to a radiator for cooling a transformer, preferably a power transformer, or a choke, in which the radiator includes a plurality of plate-shaped radiator elements which are disposed parallel to one another and through which a coolant can flow in parallel. The invention also relates to a unit including a transformer and a radiator, or a unit including a choke and a radiator, and to a method for producing a radiator.

The invention can also be used for radiators provided for cooling other electrical equipment which is likewise cooled with a liquid coolant, such as mineral oil or ester.

Description of the Related Art

Power transformers are frequently cooled by radiators, which means that heated coolant is led out of the housing of the power transformer, lead through one or more radiators and back into the housing. In the radiator, the heat is discharged to the surrounding air via large surfaces. The surrounding air can circulate solely because of buoyancy (natural cooling) or be blown over the surfaces of the radiator by using fans (forced cooling). The radiators are normally constructed as plate radiators, in which the air can flow between a plurality of plate-shaped radiator elements, while the coolant to be cooled is led in parallel through the radiator elements of a plate radiator.

In hermetically sealed units (housing of a transformer and radiator(s) or housing of a choke and radiator(s)), the thermal expansion of the coolant must be absorbed or, viewed in another way, a pressure rise in the unit including the transformer or the choke and the radiator must be absorbed. That can be done by using a separate gas volume, that is to say, for example, an expansion vessel, but that is to be avoided as far as possible. However, it is also known to construct the radiator as an expansion radiator, in which the volume of the radiator elements themselves is enlarged by expansion, in particular bulging of the walls of the radiator elements. In that case, plastic deformation of the radiator elements must be avoided. Plate-shaped radiator elements generally include two, in particular identical, half-shells, which are welded to each other at the edge. Those walls are normally structured, in order, for example to form flow channels. Where the walls have indentations, for example, channel-shaped longitudinal indentations or beads, the walls of a radiator element that are located opposite each other have a small spacing, and can be connected to one another by spot welding. That firstly increases the compressive strength of the radiator element but, on the other hand, reduces its volume expansion.

BRIEF SUMMARY OF THE INVENTION

It is accordingly an object of the invention to provide a radiator for cooling a transformer or a choke, a unit including a transformer or a choke and a method for producing a radiator, which overcome the hereinafore-mentioned disadvantages of the heretofore-known radiators, units and methods of this general type, in which the volume expansion of radiator elements is increased as compared with radiator elements having spot welds but in which plastic deformation of walls of the radiator elements is nevertheless prevented.

With the foregoing and other objects in view there is provided, in accordance with the invention, a radiator for cooling a transformer, preferably a power transformer, or a choke, the radiator comprising a plurality of plate-shaped radiator elements which are disposed parallel to one another and through which a coolant can flow in parallel, and at least one elastically deformable element disposed at least between two adjacent radiator elements and constructed in such a way that it counteracts expansion of the radiator elements perpendicular to the surface of the radiator elements.

The at least one elastically deformable element therefore counteracts expansion of the radiator element from outside, causing plastic deformation of the walls of the radiator element to be prevented. Where the elastically deformable element acts on the radiator element, no further volume limitation is necessary, and a spot weld can be omitted in this case. To this extent, greater volume expansion is possible, since no spot weld predefines a maximum possible volume expansion there.

In principle, however, it is possible for a radiator element to be provided with spot welds in one or more areas and no spot welds in one or more other areas, but rather only one or more elastically deformable elements.

One embodiment of the invention, however, resides in the radiator elements for which an elastically deformable element is provided having no weld within their edge, in particular no spot weld, between mutually opposite walls. Of course, in this case, the necessary welds which possibly connect the individual parts of the radiator elements to one another must be present. These are generally located at the edge of a radiator element. This weld is, for example, the peripheral welded seam which connects two half-shells of a radiator element to each other. Furthermore, however, no welds which connect opposite walls of the radiator element to each other are provided. As a result, the cross section of the radiator element is not reduced by spot welds.

Since the elements according to the invention are attached outside the radiator elements, they do not change the hydraulic characteristics in the interior of the radiator elements. In addition, the elements according to the invention can be attached retrospectively to a radiator and do not have to be attached as early as during the production of the radiator, that is to say, before the radiator elements are assembled to form a radiator.

The elastically deformable element can, in particular, be made of spring steel. Spring steel is defined in relevant standards and is distinguished by a high elastic limit, for example by an elastic limit of at least 1150 N/mm² with a tensile strength of 1300 to 1600 N/mm².

In one embodiment of the invention, provision is made for the elastically deformable element to be made of a spring steel strip. In this way, the element can be adapted simply to the distance between the two radiator elements, which can vary over the length and/or width of the radiator element, by being bent once or repeatedly, in particular perpendicularly to the longitudinal extent of the spring steel strip.

In particular, provision can be made in this embodiment for the spring steel strip to be bent in a wave shape, wherein at least one vertex engages with a radiator element. The vertex will generally merely rest on the radiator element and will not be specifically fixed there. The bent spring steel strip will therefore be connected fixedly, e.g. welded, only at its ends to one and/or the other adjacent radiator element.

In particular, provision can be made for at least one further vertex to engage with the other radiator element. In this case, too, the vertex will generally merely rest on the radiator element and will not be specifically fixed there.

The spring steel strip bent in a wave shape will generally have a multiplicity of vertices. A spring steel strip can extend over the entire length or width of a radiator element. Therefore, only a single element will be needed for the entire length or width and only two fixing points are needed.

In particular, in this case, provision can be made for the elastically deformable element to be fixed only to the edge of at least one radiator element, which thus makes the fixing of the spring steel strip easier.

However, it is also conceivable for multiple, in particular identical, elastically deformable elements to be provided over the length and/or width of the radiator element.

In an alternative embodiment, provision can be made for the elastically deformable element to be a helical spring, the two ends of which each engage with a radiator element. As a rule, multiple helical springs will be provided for each pair of mutually opposite radiator elements. The length of the helical springs must be coordinated with the distance between the two radiator elements. The helical springs will, as a rule, be aligned perpendicularly to the surface of the radiator element.

Irrespective of how the elastically deformable elements are then constructed, provision can be made for multiple elastically deformable elements distributed over the length and/or width of a radiator element to be provided, wherein a first elastically deformable element has a different spring constant than a second elastically deformable element. By varying the spring constant, the flexibility of the element is established and therefore how greatly the radiator elements can expand at the location of this element. It is, therefore, possible to establish a situation where the radiator elements can expand more at a specific location than at another location. Thus, for example at a location where less expansion is desired, stiffer helical springs could be used than at another location, where more expansion is permitted.

Provision can be made for the elastically deformable element to be held in its position between two adjacent radiator elements by form-locking. This has the advantage that this form-locking contributes to the fixing of the element, and an additional fixing can be omitted or configured to be less highly load-bearing. Thus, the element could already fulfill its function merely as a result of the insertion as far as the desired position between the adjacent radiator elements.

The invention can be applied to different types of radiators, for example to plate radiators and to so-called corrugated tanks, in which the radiator elements are part of the tank of the transformer or the choke.

With the objects of the invention in view, there is also provided a unit comprising a transformer and a radiator according to the invention or comprising a choke and a radiator according to the invention. The radiator is incorporated into the cooling circuit of the transformer or the choke.

Provision can firstly be made for the radiator elements to be part of the tank of the transformer or the tank of the choke and for each radiator element to be connected directly to the interior of the tank. The radiator then does not form a separate component but a unit with the tank of the transformer or the choke. This would be the case in a corrugated tank. Secondly, provision can be made for the radiator to be separated physically from the tank of the transformer or the choke and for at least one line to be provided between the tank and the radiator. The line therefore opens into the radiator formed as a separate component, and the coolant will be distributed to the individual radiator elements in the radiator only downstream of the line.

With the objects of the invention in view, there is furthermore provided a method for producing a radiator according to the invention in such a way that the at least one elastically deformable element is attached to a radiator which is already in operation and is connected to a transformer or a choke.

In particular, provision can be made for the at least one elastically deformable element to be pushed in between two adjacent radiator elements and to be held in its position between the two adjacent radiator elements by form-locking.

Other features which are considered as characteristic for the invention are set forth in the appended claims.

Although the invention is illustrated and described herein as embodied in a radiator for cooling a transformer or a choke, a unit including a transformer or a choke and a method for producing a radiator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
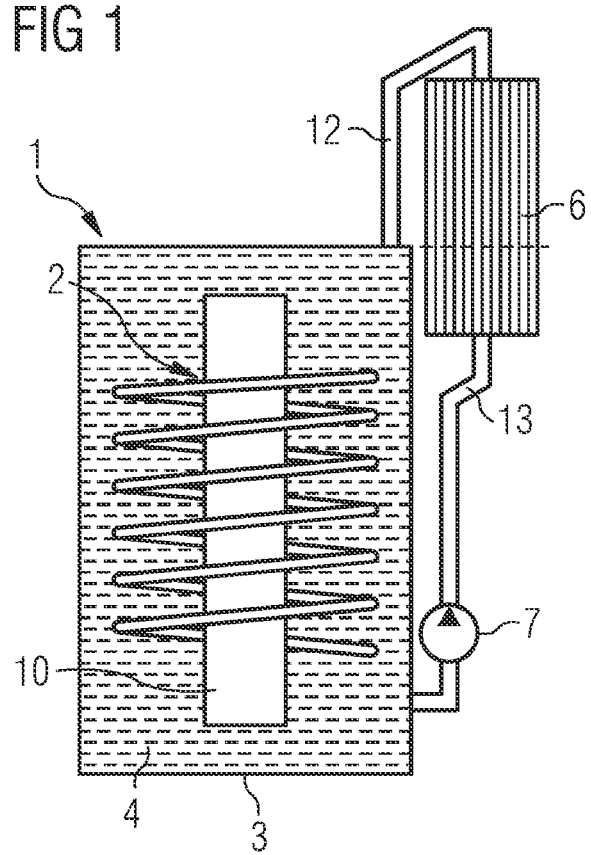
FIG. 1 is a diagrammatic, longitudinal-sectional view of a transformer having a radiator.

Referring now in detail to the figures of the drawings, which are exemplary and non-limiting, and first, particularly, to FIG. 1 thereof, there is seen a diagrammatic illustration of a transformer 1. The transformer 1 has at least one transformer winding 2, which is wound around a core 10. The transformer winding 2 includes, for example, a lower voltage winding and an upper voltage winding, which are not specifically illustrated. Furthermore, the transformer 1 has a housing 3, which is filled with a coolant 4. In this case, an expansion vessel is provided in order to absorb the coolant 4 at high temperatures.

Figure 2:
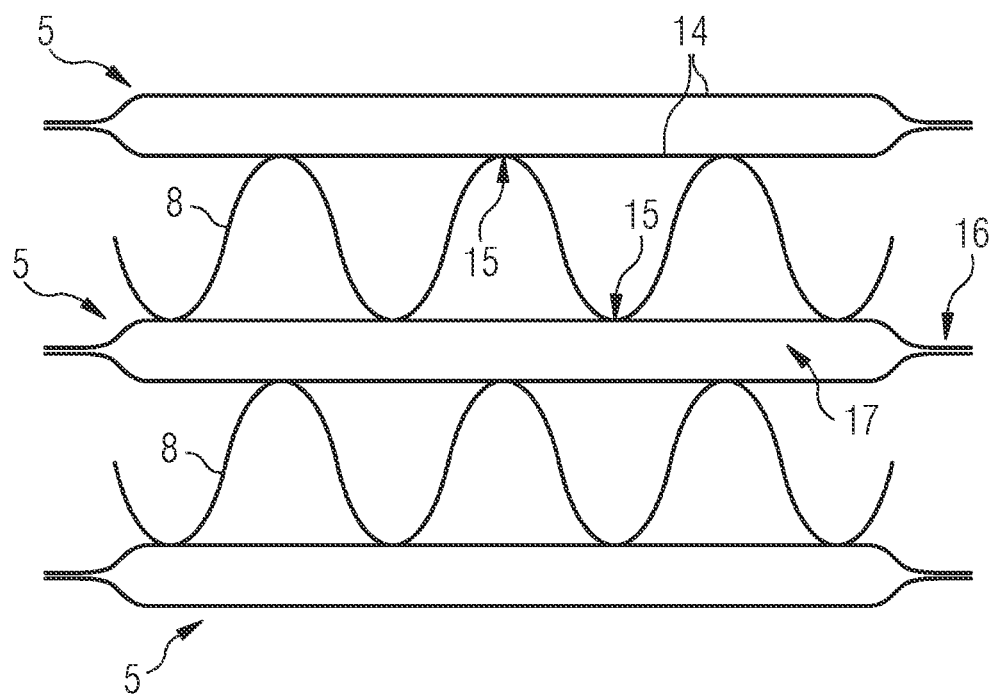
FIG. 2 is a cross-sectional view of a first radiator according to the invention, including spring steel strips.
Figure 3:
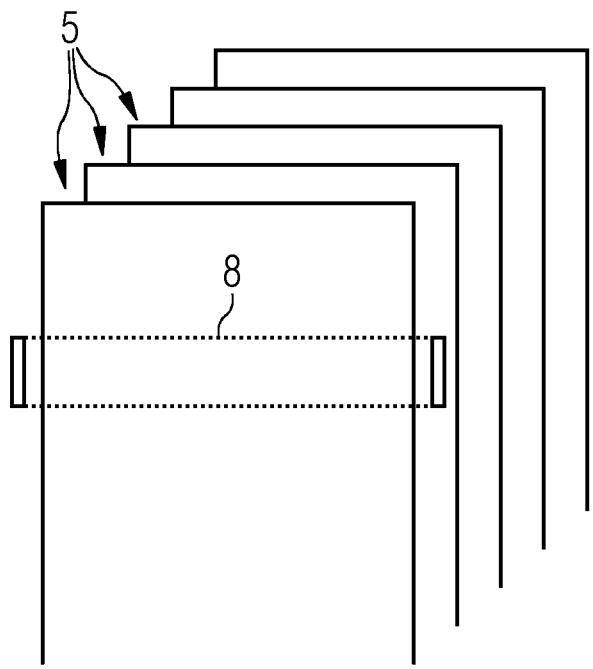
FIG. 3 is a fragmentary, perspective view of the radiator of FIG. 2.
Figure 4:
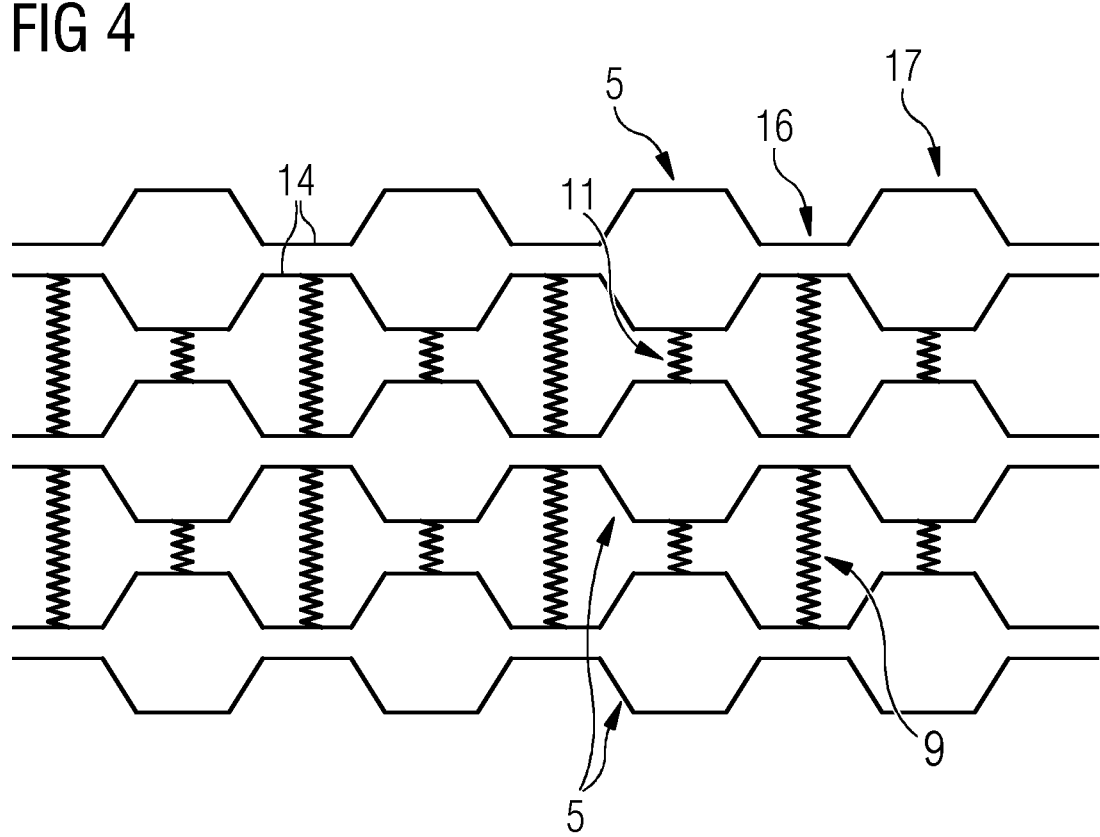
FIG. 4 is a fragmentary, cross-sectional view of a second radiator according to the invention, including helical springs.

A cooling circuit which is provided starts from the housing 3. The cooling circuit has a riser pipe 12 as a rising section. In addition, a return pipe 13 leading back into the housing 3 is provided. At least one radiator 6 is provided between the riser pipe 12 and the return pipe 13. The radiator 6 includes multiple plate-shaped radiator elements 5 disposed parallel to one another, through which a flow passes, as seen in FIGS. 2 to 4. The radiator elements 5 are as a rule also disposed parallel to one another. Cooling air flows through between the radiator elements 5 and parallel to the radiator elements 5.

Furthermore, a pump 7 for sucking the coolant 4 in and out in the cooling circuit can be disposed, for example in the return pipe 13, as a result of which a forced circulation of the coolant 4 within the cooling circuit and the housing 3 occurs.

As is seen in FIG. 2, at least one elastically deformable element in the form of a spring steel strip 8 is provided between two radiator elements 5. The spring steel strip 8 is bent in a wave shape so that at least vertices 15, in this case three upper vertices 15, engage with upper radiator elements 5, while four lower vertices 15 engage with lower radiator elements 5. The radiator elements 5 can continue further on the left and right. Thus, a bead 16 could again follow a convexity 17, and so on. The spring steel strips 8 would continue likewise.

Each radiator element 5 is made in this case of two identical half-shells 14, which normally have an approximately rectangular shape. The two half-shells 14 are welded to each other at their approximately rectangular edge. According to the prior art, spot welds would additionally be applied in the beads 16, in order to suppress excessively high expansion of the half-shells 14. According to the invention, however, no spot welds are provided in this case. Instead, excessively high expansion of the half-shells 14 is prevented solely by the spring steel strips 8, which press against the half-shells 14 when the latter expand perpendicular to the—horizontal in this illustration—surface of the radiator elements 5 or half-shells 14.

FIG. 3 shows a diagrammatic illustration of the radiator of FIG. 2 in a perspective view, in which only one spring steel strip 8 is shown, in this case extending over the entire width of the radiator elements 5 and being fixed to the sides of the radiator element 5. Further spring steel strips 8 can be disposed above and below the latter between the same radiator elements 5. Spring steel strips 8 can also be located between the other radiator elements 5.

Each spring steel strip 8 can be pushed in simply between the radiator elements 5 as far as the desired position, in which case their position is already defined by form-locking. For safety, the spring steel strips 8 can additionally be fixed to the radiator elements 5, e.g. at the edge of the latter, in order, for example, to prevent slippage during transport or during operation.

FIG. 4 shows a detail of a second radiator according to the invention in cross section, including helical springs 9. The helical springs 9, which connect two adjacent radiator elements 5 to each other in the area of the beads 16, have a greater length than helical springs 11 which connect two adjacent radiator elements 5 to each other in the area of the convexities 17. In this case, too, no spot welds between mutually opposite walls 14 are provided in the radiator elements 5. If the mutually facing walls 14 of two adjacent radiator elements 5 approach each other as a result of the volume expansion of the radiator elements 5, this movement is counteracted by the helical springs 9, 11 and the movement is limited.

LIST OF REFERENCES

1 Transformer
2 Transformer winding
3 Housing
4 Coolant
5 Radiator element
6 Radiator
7 Pump
8 Spring steel strip (elastically deformable element)
9 Helical spring (elastically deformable element)
10 Core
11 Helical spring (elastically deformable element)
12 Riser pipe
13 Return pipe
14 Half-shell of the radiator element 5
15 Vertex
16 Bead
17 Convexity

The invention claimed is:

1. A radiator for cooling a transformer or a power transformer or a choke, the radiator comprising:
   a plurality of mutually-parallel plate-shaped radiator elements for guiding a parallel through-flow of a coolant, said radiator elements having mutually opposite walls and edges;
   at least one elastically deformable element disposed between at least an adjacent two of said radiator elements, said at least one elastically deformable element configured for counteracting an expansion of said radiator elements perpendicular to a surface of said radiator elements;
   said radiator elements disposed adjacent said at least one elastically deformable element having no weld and no spot weld within said edges between said mutually opposite walls.

2. The radiator according to claim 1, wherein said at least one elastically deformable element is made of spring steel.

3. The radiator according to claim 1, wherein said at least one elastically deformable element is made of a spring steel strip.

4. The radiator according to claim 3, wherein said spring steel strip is bent in a wave shape and has at least one vertex engaging with one of said radiator elements.

5. The radiator according to claim 4, wherein said spring steel strip has at least one further vertex engaging with another of said radiator elements.

6. The radiator according to claim 3, wherein said spring steel strip extends over an entire length or width of one of said radiator elements.

7. The radiator according to claim 1, wherein said radiator elements have edges, and said at least one elastically deformable element is fixed only to said edge of at least one of said radiator elements.

8. The radiator according to claim 1, wherein said at least one elastically deformable element is a helical spring having two ends each engaging with a respective one of said radiator elements.

9. The radiator according to claim 1, wherein said at least one elastically deformable element includes a plurality of elastically deformable elements distributed over at least one of a length or a width of said radiator elements, and said plurality of elastically deformable elements include first and second elastically deformable elements having different spring constants.

10. The radiator according to claim 1, wherein said at least one elastically deformable element is held in position form-lockingly between said adjacent two of said radiator elements.

11. A unit, comprising:
a transformer or a choke; and
a radiator according to claim 1.

12. A method for producing a radiator, the method comprising:
producing the radiator according to claim 1 by attaching said at least one elastically deformable element to a radiator already being in operation and being connected to a transformer or a choke.

13. The method according to claim 12, which further comprises pushing the at least one elastically deformable element in between two adjacent radiator elements, and form-lockingly holding the at least one elastically deformable element in position between the two adjacent radiator elements.

* * * * *